(12) United States Patent
Duan

(10) Patent No.: US 12,231,605 B2
(45) Date of Patent: Feb. 18, 2025

(54) IMAGE FORMING APPARATUS AND PROMPTING METHOD BASED ON NUMBER OF TASKS TO-BE-PROCESSED

(71) Applicant: Zhuhai Pantum Electronics Co., Ltd., Zhuhai (CN)

(72) Inventor: Chenghao Duan, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/082,534

(22) Filed: Dec. 15, 2022

(65) Prior Publication Data
US 2023/0199128 A1    Jun. 22, 2023

(30) Foreign Application Priority Data
Dec. 16, 2021    (CN) .......................... 202111544126.1

(51) Int. Cl.
*H04N 1/00* (2006.01)

(52) U.S. Cl.
CPC ..... *H04N 1/00477* (2013.01); *H04N 1/00408* (2013.01)

(58) Field of Classification Search
CPC ............ H04N 1/00477; H04N 1/00408; G06F 3/1207; G06F 3/1259; G06F 3/1229; G06F 3/121
See application file for complete search history.

(56) References Cited

U.S. PATENT DOCUMENTS

| | | | |
|---|---|---|---|
| 11,575,801 B2 * | 2/2023 | Takayama | G06F 3/1254 |
| 2003/0041116 A1 * | 2/2003 | Jeyachandran | G06Q 10/107 |
| | | | 709/217 |
| 2003/0214657 A1 * | 11/2003 | Stringham | H04L 69/329 |
| | | | 358/1.15 |
| 2004/0021899 A1 * | 2/2004 | Jost | G06F 3/1207 |
| | | | 379/265.09 |
| 2008/0198398 A1 | 8/2008 | Sasamae | |
| 2009/0102970 A1 | 4/2009 | Yamamoto | |
| 2010/0079786 A1 * | 4/2010 | Yamada | G06F 3/1285 |
| | | | 358/1.14 |
| 2016/0167310 A1 * | 6/2016 | Lee | B29C 64/386 |
| | | | 700/98 |
| 2016/0308855 A1 * | 10/2016 | Lacey | H04L 63/061 |
| 2021/0241600 A1 * | 8/2021 | Kim | G06Q 10/1097 |
| 2023/0412853 A1 * | 12/2023 | Cai | H04N 21/431 |
| 2024/0134491 A1 * | 4/2024 | Yang | G06F 3/0482 |

FOREIGN PATENT DOCUMENTS

| | | |
|---|---|---|
| CN | 101031011 A | 9/2007 |
| CN | 103186734 A | 7/2013 |
| CN | 106427244 A | 2/2017 |
| CN | 107423001 A | 12/2017 |

(Continued)

*Primary Examiner* — Iriana Cruz
(74) *Attorney, Agent, or Firm* — ANOVA LAW GROUP PLLC

(57) ABSTRACT

A prompting method includes determining to use a custom prompting manner to prompt a status of an image forming apparatus, in response to detecting that the status of the image forming apparatus satisfies a prompting condition, generating a custom prompting message corresponding to the status of the image forming apparatus, and presenting the custom prompting message to a user.

16 Claims, 2 Drawing Sheets

---

201 — An image forming apparatus determines to use a custom prompting manner to prompt a status of the image forming apparatus 202 — In response to detecting that the status of the image forming apparatus satisfies a prompting condition, generate a custom prompting message corresponding to the status of the image forming apparatus 203 — Present the custom prompting message to a user

(56) References Cited

FOREIGN PATENT DOCUMENTS

| | | |
|---|---|---|
| JP | 2008211559 A | 9/2008 |
| JP | 2011019090 A | 1/2011 |
| JP | 2011155547 A | 8/2011 |
| JP | 2018050296 A | 3/2018 |
| JP | 2020072352 A | 5/2020 |
| JP | 2021142687 A | 9/2021 |
| JP | 2021164032 A | 10/2021 |
| JP | 2021177296 A | 11/2021 |
| KR | 20030093760 A | 12/2003 |

* cited by examiner

IMAGE FORMING APPARATUS AND PROMPTING METHOD BASED ON NUMBER OF TASKS TO-BE-PROCESSED

CROSS-REFERENCE TO RELATED APPLICATION

This application claims priority to Chinese Patent Application No. 202111544126.1, filed Dec. 16, 2021, the entire content of which is incorporated herein by reference.

TECHNICAL FIELD

The present disclosure relates to the field of image forming apparatus and, in particular, to an image forming apparatus and a prompting method.

BACKGROUND

An image forming apparatus is an apparatus that forms an image on a recording medium based on an imaging principle. The image forming apparatus includes, for example, a printer, a copier, a facsimile machine, a multi-functional image making and copying apparatus, or an electrostatic printing apparatus, etc.

When the image forming apparatus is running, the image forming apparatus usually displays a certain prompting message according to a current status. For example, when the image forming apparatus executes a printing task, the prompting message of "printing" is displayed. When the current printing task is completed, the prompting message of "printing completed" is displayed.

The existing status prompting method of the image forming apparatus enables a user to know the status of the image forming apparatus. However, the existing status prompting method has ambiguity in the prompting, which makes it difficult for the user to accurately determine the current status of the image forming apparatus.

SUMMARY

In accordance with the disclosure, there is provided a prompting method including determining to use a custom prompting manner to prompt a status of an image forming apparatus, in response to detecting that the status of the image forming apparatus satisfies a prompting condition, generating a custom prompting message corresponding to the status of the image forming apparatus, and presenting the custom prompting message to a user.

Also in accordance with the disclosure, there is provided an image forming apparatus including at least one processor and at least one memory communicated connected to the at least one processor. The at least one memory stores a computer program, when the computer program being executed, causing the at least one processor to determine to use a custom prompting manner to prompt a status of the image forming apparatus, in response to detecting that the status of the image forming apparatus satisfies a prompting condition, generate a custom prompting message corresponding to the status of the image forming apparatus, and present the custom prompting message to a user.

Also in accordance with the disclosure, there is provided a non-transitory computer-readable storage medium storing a computer program that, when the computer program being executed by at least one processor, causing the at least one processor to perform determining to use a custom prompting manner to prompt a status of an image forming apparatus, in response to detecting that the status of the image forming apparatus satisfies a prompting condition, generating a custom prompting message corresponding to the status of the image forming apparatus, and presenting the custom prompting message to a user.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

The terms used herein are used for descriptive purposes only and should not be understood as indicating or implying relative importance or implicitly indicating the number of technical features indicated. Thus, a feature described with a singular form, such as "a" and "the," may include one or more of such features explicitly or implicitly.

Figure 1:
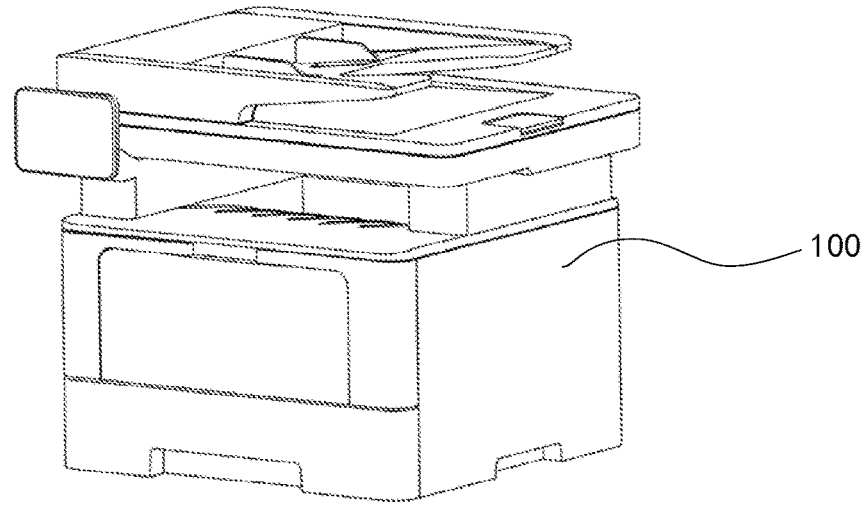
FIG. 1 is a schematic structural diagram of an image forming apparatus consistent with the embodiments of the disclosure.

FIG. 1 is a schematic structural diagram of an image forming apparatus 100 consistent with the embodiments of the disclosure. In some embodiments, the image forming apparatus 100 may include a printer, a copier, a facsimile machine, a multi-functional image making and copying apparatus, or an electrostatic printing apparatus, etc. When a user performs a job using the image forming apparatus 100, the image forming apparatus 100 displays a certain prompting message according to a status of the job. To enable the image forming apparatus 100 to perform more accurate prompting of a current status of the image forming apparatus 100, a prompting method for prompting the status of the image forming apparatus 100 consistent with the embodiments of the present disclosure is provided. The prompting method supports customizing a prompting message to prompt the status of the image forming apparatus 100. By customizing the prompting message to prompt the status of the image forming apparatus 100, the status of the image forming apparatus 100 can be clearly presented, thereby reducing the ambiguous semantics in the prompting message.

Figure 2:
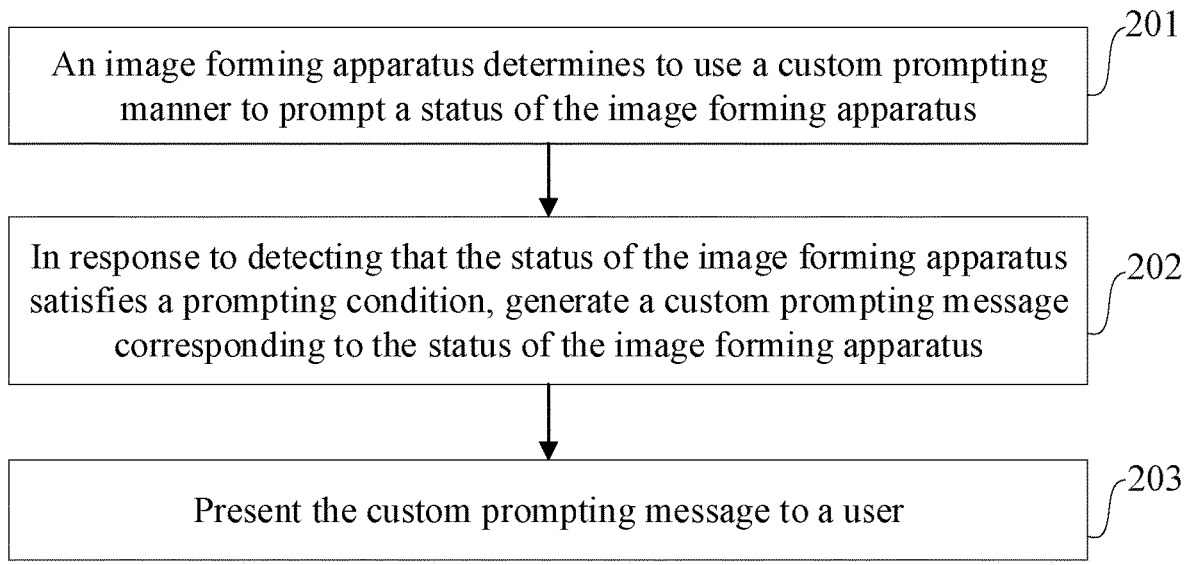
FIG. 2 is a schematic flow chart of a prompting method consistent with the embodiments of the disclosure.

FIG. 2 is a schematic flow chart of a prompting method consistent with the embodiments of the disclosure. As shown in FIG. 2, the prompting method includes the following processes.

At 201, an image forming apparatus determines to use a custom prompting manner to prompt a status of the image forming apparatus.

In some embodiments, the image forming apparatus may determine to use the custom prompting manner to prompt the status of the image forming apparatus in various ways.

For example, the image forming apparatus may determine to use the custom prompting manner to prompt the status of the image forming apparatus according to at least one of a system configuration of the image forming apparatus, a command sent by a terminal device, or a number of one or more tasks to-be-processed received within a first time period. The terminal device is configured to issue the one or more tasks to-be-processed. When the image forming apparatus determines to use the custom prompting manner to prompt the status of the image forming apparatus, the image forming apparatus is in a custom prompting mode.

In some embodiments, the system configuration of the image forming apparatus may include a configuration item "whether to use a custom prompting manner to prompt the status of the image forming apparatus." When a user selects the configuration item of "prompt the status of the image forming apparatus using a custom prompting manner," that is, in response to the system configuration of the image forming apparatus including a configuration item indicating to use the custom prompting manner to prompt the status of the image forming apparatus, it is determined to use the custom prompting manner to prompt the status of the image forming apparatus.

In some embodiments, the image forming apparatus may receive a first command from the terminal device. The terminal device is configured to issue the one or more tasks to-be-processed. The first command may be used to instruct the image forming apparatus to prompt the status of the image forming apparatus in a custom prompting manner. In some embodiments, the first command may be configured when the terminal device issues the task to-be-processed. In some embodiments, the first command may be configured when or after the terminal device establishes a communicated connection with the image forming apparatus. When the terminal device sends the task to-be-processed to the image forming apparatus, the terminal device automatically sends the first command to the image forming apparatus to cause the image forming apparatus to determine to use the custom prompting manner to prompt the status of the image forming apparatus according to the first command.

In some embodiments, the image forming apparatus may automatically enable to use the custom prompting manner to prompt the status of the image forming apparatus. In some embodiments, in response to a number of the one or more tasks to-be-processed received by the image forming apparatus within the first period being greater than a first threshold, the image forming apparatus may determine to use the custom prompting manner to prompt the status of each of the one or more tasks to-be-processed.

In some embodiments, the image forming apparatus may determine whether to use the custom prompting manner according to a plurality of determination conditions. In some embodiments, in response to the system configuration of the image forming apparatus including a configuration item indicating to use the custom prompting manner to prompt the status of the image forming apparatus and the number of tasks to-be-processed received within the first time period being greater than the first threshold, the image forming apparatus determines to use the custom prompting manner to prompt the status of the image forming apparatus.

At 202, in response to detecting that the status of the image forming apparatus satisfies a prompting condition, the image forming apparatus generates a custom prompting message corresponding to the status of the image forming apparatus.

In some embodiments, in response to detecting that a status of a member of the image forming apparatus satisfies the prompting condition, the image forming apparatus may generate a custom prompting message corresponding to the status of the member of the image forming apparatus. For example, when an ink cartridge of the image forming apparatus is out of ink, a paper tray is out of paper, or a paper output part is jammed, the image forming apparatus may generate the custom prompting message corresponding to the status of the member. For example, when the paper tray is out of paper, the custom prompting message may be "the paper tray should be filled with paper."

In some embodiments, in response to detecting that a status of a task to-be-processed satisfies the prompt condition, the image forming apparatus may generate a custom prompt message of the status of the task to-be-processed. For example, when the task to-be-processed starts to be executed, when the task to-be-processed is completed, or when the image forming apparatus switches from the task to-be-processed of a user to a task to-be-processed of another user, the image forming apparatus may generate the custom prompting message of the status of the task to-be-processed.

In some embodiments, when the status of the member of the image forming apparatus and the status of the task to-be-processed simultaneously satisfy the prompting conditions, the status of the member and the status of the task to-be-processed may be prompted respectively through different custom prompting messages, or may be both prompted in a same custom prompting message.

In some embodiments, when the status of the image forming apparatus satisfies the prompting condition, the custom prompting message may be generated based on at least one of: default prompting message associated with the status of the image forming apparatus, a custom configuration sent by a terminal device, information of the terminal device, account information bounded to the terminal device, or keyword information extracted from a currently executed task to-be-processed. The terminal device is configured to issue a task to-be-processed. The custom configuration includes custom content associated with the status of the image forming apparatus.

In a non-custom prompting mode, the image forming apparatus may use the default prompting message to prompt the status of the image forming apparatus. The default prompt message may include "printing completed," "printing," or "paper tray is out of paper." In the custom prompting mode, the image forming apparatus may generate the custom prompting message based on the default prompting message to prompt the status of the image forming apparatus through the custom prompting message. In some embodiments, the custom prompting message may be generated based on one or more of the default prompting message, the information of the terminal device that issues the task to-be-processed, the custom configuration sent by the terminal device that issues the task to-be-processed, the account information bounded to the terminal device that issues the task to-be-processed, and the keyword information extracted from the currently executed task to-be-processed. For example, the keyword information extracted by the image forming apparatus from the currently executed task to-be-processed includes name information of a user, the image forming apparatus may generate the custom prompting message according to the default prompting message associated with a current status of the image forming apparatus and the name information of the user. For example, the image forming apparatus recognizes a signature of the user from current print content, and obtains the name information of the user by analyzing the signature of the user. Furthermore, the name information of the user and the default prompting message may be combined into the custom prompting message. In some embodiments, when the printing task is completed or the printing task is executed, the custom prompting message may be "printing task of XXX is completed" or "printing task of XXX is in progress," where "XXX" is the name information of the user. In some embodiments, "XXX" may be the information of the terminal device or the account information.

In some embodiments, the image forming apparatus may generate the custom prompting message according to the custom configuration sent by the terminal device. The custom configuration may include custom content associated with the status of the image forming apparatus.

In some embodiments, the image forming apparatus may generate the custom prompting message according to the status of the image forming apparatus and the information of the terminal device that issues the task to-be-processed. For example, when the image forming apparatus executes a printing task, the custom prompting message may be "a printing task for the first device is in progress." The information of the terminal device may include a model of the terminal device or a name of the terminal device. In some embodiments, the image forming apparatus may generate the custom prompting message according to the account information bounded to the terminal device and the status of the task executed.

At 203, the image forming apparatus presents the custom prompting message to a user.

In some embodiments, after the complete custom prompting message is generated, the image forming apparatus may present the user with the custom prompting message. In some embodiments, a manner of presenting the custom prompting message may be determined according to the system configuration of the image forming apparatus. In some embodiments, the image forming apparatus may determine the manner of presenting the custom prompting message according to a command sent by the terminal device that issues the task to-be-processed. The image forming apparatus may present the user with the custom prompting message according to the determined presenting manner.

In some embodiments, the custom prompting message may be presented at the image forming apparatus and/or at a corresponding terminal device. The corresponding terminal device may be the terminal device that issues the task to-be-processed, or another terminal device that has an associated relationship with the terminal device that issues the task to-be-processed. For example, the terminal device that has the associated relationship with the terminal device that issues the task to-be-processed, includes a device logging into a same account as the terminal device that issues the task to-be-processed.

In some embodiments, the image forming apparatus and/or the corresponding terminal device may present the custom prompting message by a manner of voice and/or text. For example, the custom prompting message may be played at the image forming apparatus by a voice, or may be displayed at the image forming apparatus by a text. Similarly, the custom prompting message may be played by a voice at the terminal device of the user, or may be displayed by a text at the terminal device of the user.

Figure 3:
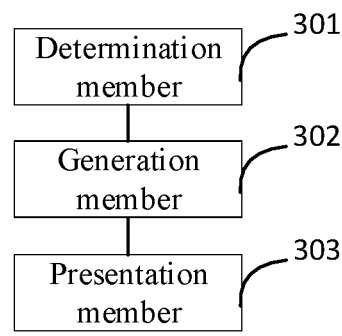
FIG. 3 is a schematic structural diagram of an image forming apparatus consistent with the embodiments of the disclosure.

FIG. 3 is a schematic structural diagram of an image forming apparatus consistent with the embodiments of the disclosure. As shown in FIG. 3, the image forming apparatus includes a determination member 301, a generation member 302, and a presentation member 303. The determination member 301 is configured to determine to use a custom prompting manner to prompt a status of the image forming apparatus. The generation member 302 is configured to, in response to detecting that the status of the image forming apparatus satisfies a prompting condition, generate a custom prompting message corresponding to the status of the image forming apparatus. The presentation member 303 is configured to present the custom prompting message to a user.

In some embodiments, the determination member 301 is further configured to determine to use the custom prompting manner to prompt the status of the image forming apparatus according to at least one of a system configuration of the image forming apparatus, a command sent by a terminal device, or a number of one or more tasks to-be-processed received within a first time period, the terminal device being configured to issue the one or more tasks to-be-processed.

In some embodiments, the determination member 301 is further configured to, in response to the system configuration of the image forming apparatus including a configuration item indicating to use the custom prompting manner to prompt the status of the image forming apparatus, determine to use the custom prompting manner to prompt the status of the image forming apparatus. In some embodiments, the determination member 301 is further configured to receive a first command from the terminal device and determine to use the custom prompting manner to prompt a status of each of the one or more tasks to-be-processed based on the first command. In some embodiments, the determination member 301 is further configured to, in response to the number of the one or more tasks to-be-processed received within the first time period being greater than a first threshold, determine to use the custom prompting manner to prompt the status of each of the one or more tasks to-be-processed.

In some embodiments, the generation member 302 is further configured to, in response to detecting that a status of a member of the image forming apparatus satisfies the prompting condition, generate a custom prompting message corresponding to the status of the member of the image forming apparatus, and/or in response to detecting that a status of a task to-be-processed satisfies the prompt condition, generate a custom prompt message of the status of the task to-be-processed.

In some embodiments, the generation member 302 is further configured to generate the custom prompting message based on at least one of default prompting message associated with the status of the image forming apparatus, a custom configuration sent by a terminal device, information of the terminal device, account information bounded to the terminal device, or keyword information extracted from a currently executed task to-be-processed. The terminal device is configured to issue a task to-be-processed. The custom configuration includes custom content associated with the status of the image forming apparatus.

In some embodiments, the keyword information extracted from the currently executed task to-be-processed includes name information of the user. The generation member 302 is further configured to generating the custom prompting message corresponding to the status of the image forming apparatus based on the default prompting information associated with the status of the image forming apparatus and the name information of the user.

In some embodiments, the presentation member 303 is further configured to determine a manner of presenting the custom prompting message according to the system configuration of the image forming apparatus or a command sent by the terminal device that issues the task to-be-processed, and present the custom prompting message to the user according to the determined manner of presenting.

In some embodiments, the presentation member 303 is further configured to present the custom prompting message at the image forming apparatus and/or at the corresponding terminal device. The presentation member 303 is configured to present the custom prompting message by a manner of a text and/or voice.

Figure 4:
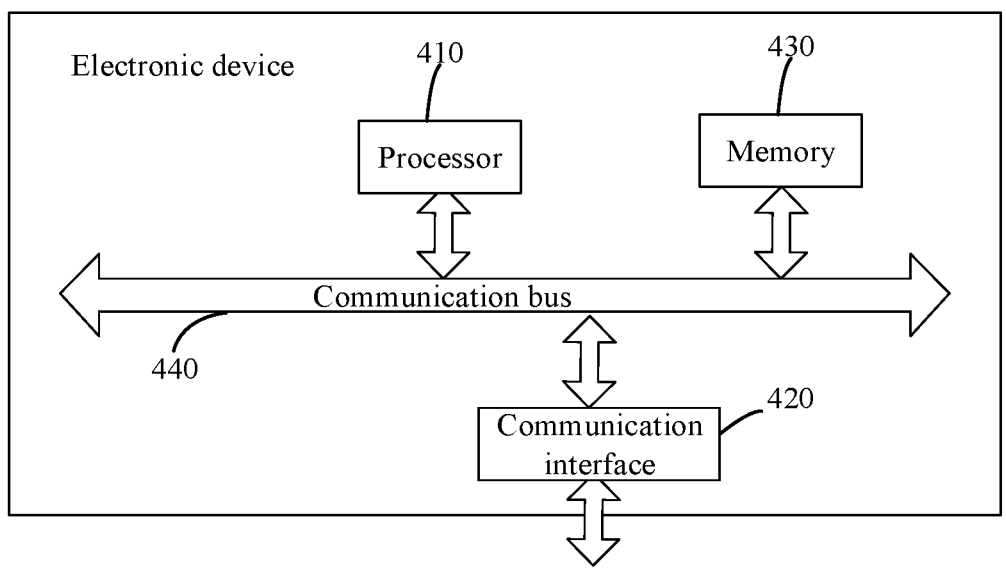
FIG. 4 is a schematic structural diagram of an electronic device consistent with the embodiments of the disclosure.

FIG. 4 is a schematic structural diagram of an electronic device consistent with the embodiments of the disclosure. As shown in FIG. 4, the image forming apparatus is embodied in a form of a general-purpose computing device. The image forming apparatus includes a processor 410, a communication interface 420, a memory 430, a communication bus 440 connecting the processor 410, the communication interface 420, and the memory 430.

Communication bus 440 may include one or more types of bus structures, for example, a memory bus or memory controller, a peripheral bus, a graphics acceleration port, a processor, and a local bus. For example, the communication bus 440 may include an industry standard architecture (ISA) bus, a micro channel architecture (MAC) bus, an enhanced ISA bus, a video electronics standards association (VESA) local bus, or a peripheral component interconnection (PCI) bus.

Electronic devices typically include various computer-readable medium which may be any available medium that can be accessed by the electronic device. The computer-readable medium may include both volatile and nonvolatile medium, removable and non-removable medium.

The memory 430 may include a computer-readable medium in a form of volatile memory, such as random access memory (RAM) and/or cache memory. The electronic device may further include other removable/non-removable, volatile/non-volatile computer system storage medium. The memory 430 may include at least one program product having a set of program modules configured to perform the functions consistent with the embodiments of the present disclosure.

The processor 410 is configured to execute various functional applications and data processing by running the program stored in the memory 430, for example, to implement the prompting method consistent with the embodiments of the present disclosure.

A non-transitory computer-readable storage medium storing a computer program that, when executed by at least one processor, causing the at least one processor to perform the prompting method consistent with the embodiments of the present disclosure.

The non-transitory computer-readable storage medium may include a combination of one or more computer-readable medium, which can be a computer-readable signal medium or a computer-readable storage medium. The computer-readable storage medium can be but not limited to for example, an electrical, magnetic, optical, electromagnetic, infrared, or semiconductor system, apparatus, or device, or a combination of any of the above. For example (non-exhaustive list), the computer-readable storage medium may include portable computer disks or hard disks with electrical connections with one or more wires, a read-only memory (ROM), a random access memory (RAM), a erasable programmable read only memory (EPROM), a flash memory, optical fiber, portable compact disk read only memory (CD-ROM), optical storage device, magnetic memory device, or a combination of any of the above. The computer-readable storage medium can be any tangible medium that contains or stores a program that can be used by or in conjunction with an instruction execution system, apparatus, or device.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A prompting method comprising:
    determining to use a custom prompting manner to prompt a status of an image forming apparatus, in response to a number of one or more to-be-processed tasks received from a terminal device within a first time period being greater than a first threshold;
    in response to detecting that the status of the image forming apparatus satisfies a prompting condition, generating a custom prompting message corresponding to the status of the image forming apparatus;
    in response to detecting that a status of a to-be-processed task satisfies the prompting condition, generating the custom prompting message according to the status of the to-be-processed task;
    extracting name information of a user from the one or more to-be-processed tasks, wherein the custom prompting message includes the name information of the user; and
    presenting the custom prompting message to the user.

2. The method of claim 1, wherein generating the custom prompting message includes:
    in response to detecting that a status of a member of the image forming apparatus satisfies the prompting condition, generating the custom prompting message according to the status of the member of the image forming apparatus.

3. The method of claim 1, wherein generating the custom prompting message includes generating the custom prompting message based on at least one of:
    default prompting message associated with the status of the image forming apparatus;
    a custom configuration sent by the terminal device;
    information of the terminal device;
    account information bounded to the terminal device; or
    keyword information extracted from a currently executed to-be-processed task.

4. The method of claim 1, wherein presenting the custom prompting message to the user includes:
    determining a manner of presenting the custom prompting message; and
    presenting the custom prompting message to the user in the determined manner.

5. The method of claim 4, wherein presenting the custom prompting message includes:
    presenting the custom prompting message using a voice; and/or
    presenting the custom prompting message using a text.

6. The method of claim 1, wherein presenting the custom prompting message to the user includes:
    presenting the custom prompting message at the image forming apparatus to the user; and/or
    presenting the custom prompting message at a terminal device of the user.

7. The method of claim 6, wherein the terminal device of the user includes a first terminal device configured to issue the to-be-processed task or a second terminal device logged into a same account of the user as the first terminal device.

8. The method of claim 1, wherein determining to use the custom prompting manner includes:

determining to use the custom prompting manner according to a system configuration of the image forming apparatus.

9. The method of claim 1, wherein determining to use the custom prompting manner includes:
determining to use the custom prompting manner according to a command sent by the terminal device.

10. An image forming apparatus comprising:
at least one processor; and
at least one memory communicated with and connected to the at least one processor and storing a computer program,
wherein, when the computer program is executed by the at least one processor, the computer program causes the at least one processor to:
determine to use a custom prompting manner to prompt a status of the image forming apparatus, in response to a number of one or more to-be-processed tasks received from a terminal device within a first time period being greater than a first threshold;
in response to detecting that the status of the image forming apparatus satisfies a prompting condition, generate a custom prompting message corresponding to the status of the image forming apparatus;
in response to detecting that a status of a to-be-processed task satisfies the prompting condition, generate the custom prompting message according to the status of the to-be-processed task;
extract name information of a user from the one or more to-be-processed tasks, wherein the custom prompting message includes the name information of the user; and
present the custom prompting message to the user.

11. The image forming apparatus of claim 10, wherein when executed, the computer program further causes the at least one processor to:
in response to detecting that a status of a member of the image forming apparatus satisfies the prompting condition, generate the custom prompting message according to the status of the member of the image forming apparatus.

12. The image forming apparatus of claim 10, wherein the custom prompting message is generated based on at least one of:
default prompting message associated with the status of the image forming apparatus;
a custom configuration sent by the terminal device;
information of the terminal device;
account information bounded to the terminal device; or
keyword information extracted from a currently executed to-be-processed task.

13. The image forming apparatus of claim 10, wherein, when executed, the computer program further causes the at least one processor to:
determine a manner of presenting the custom prompting message; and
present the custom prompting message to the user in the determined manner.

14. The image forming apparatus of claim 13, wherein the custom prompting message is presented by:
presenting the custom prompting message using a voice; and/or
presenting the custom prompting message using a text.

15. The image forming apparatus of claim 10, wherein, when the executed, the computer program further causes the at least one processor to:
present the custom prompting message at the image forming apparatus to the user; and/or
present the custom prompting message at a terminal device of the user.

16. A non-transitory computer-readable storage medium storing a computer program that, when the computer program being executed by at least one processor, causing the at least one processor to perform:
determining to use a custom prompting manner to prompt a status of an image forming apparatus, in response to a number of one or more to-be-processed tasks received from a terminal device within a first time period being greater than a first threshold;
in response to detecting that the status of the image forming apparatus satisfies a prompting condition, generating a custom prompting message corresponding to the status of the image forming apparatus;
in response to detecting that a status of a to-be-processed task satisfies the prompting condition, generating the custom prompting message according to the status of the to-be-processed task;
extracting name information of a user from the one or more to-be-processed tasks, wherein the custom prompting message includes the name information of the user; and
presenting the custom prompting message to the user.

* * * * *